United States Patent [19]

Mori et al.

[11] 4,439,999
[45] Apr. 3, 1984

[54] ABSORPTION TYPE REFRIGERATION SYSTEM

[75] Inventors: Akio Mori; Shozo Watanabe; Mitsunobu Matsunaga, all of Toyota; Kenzi Machizawa; Ryohei Minowa, both of Ibaraki, all of Japan

[73] Assignees: Hitachi, Ltd.; Toyota Jidosha Kabushiki Kaisha, both of Tokyo, Japan

[21] Appl. No.: 448,036

[22] Filed: Dec. 8, 1982

[30] Foreign Application Priority Data

Dec. 9, 1981 [JP] Japan ............................ 56-196764

[51] Int. Cl.³ .......................................... F25B 27/02
[52] U.S. Cl. .................................... 62/238.3; 62/239; 62/476
[58] Field of Search ...................... 62/238.3, 239, 476

[56] References Cited

U.S. PATENT DOCUMENTS

| | | |
|---|---|---|
| 2,667,040 | 1/1954 | Keating, Jr. ....................... 62/238.3 |
| 2,783,622 | 3/1957 | Bourassa ........................... 62/238.3 |
| 2,953,907 | 9/1960 | De Cicco et al. ................. 62/148 |
| 3,008,303 | 11/1961 | Ruse et al. ........................ 62/238.3 |
| 3,101,599 | 8/1963 | Pippert, Sr. et al. ............ 62/239 X |
| 4,085,596 | 4/1978 | Miyamoto et al. ............... 62/476 |
| 4,183,228 | 1/1980 | Saito et al. ....................... 62/476 |
| 4,270,365 | 6/1981 | Sampietro ........................ 62/238.3 |

Primary Examiner—Lloyd L. King
Attorney, Agent, or Firm—Antonelli, Terry & Wands

[57] ABSTRACT

A combination of an internal combustion engine and an absorption type refrigeration system is designed to make a simultaneous use of both of the engine exhaust gas the heated engine cooling water. The internal combustion engine and the absorption type refrigeration system are combined such that the exhaust gas is utilized as the heat source for a gaseous refrigerant generator having the highest operating temperature in the system while heated engine cooling water is utilized as the heat source for another generator which operates at a temperature lower than the operating temperature of the first-mentioned generator.

6 Claims, 3 Drawing Figures

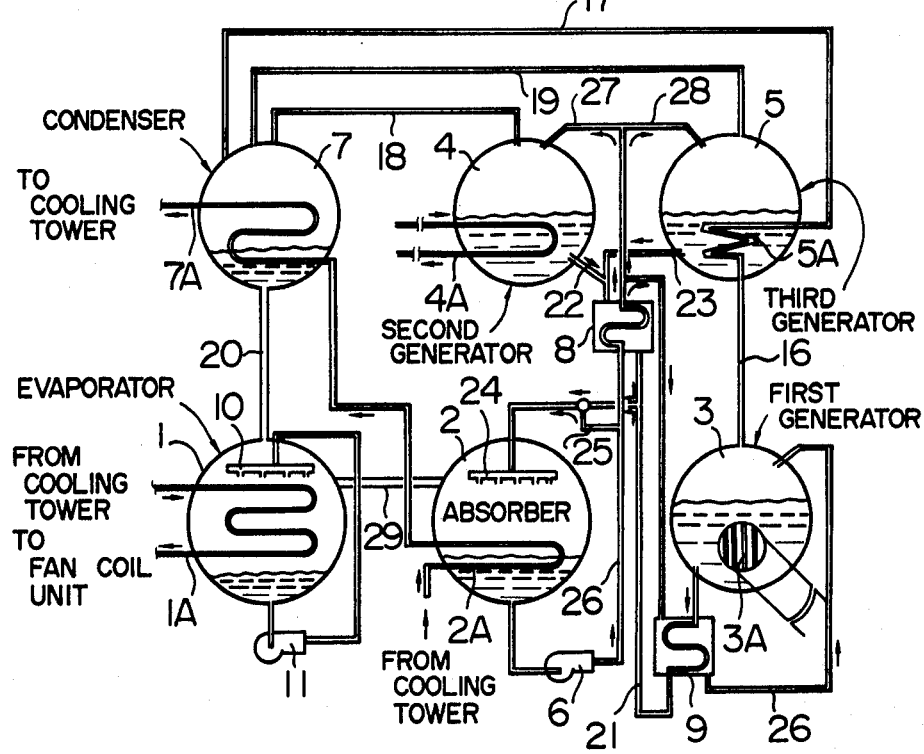

ABSORPTION TYPE REFRIGERATION SYSTEM

BACKGROUND OF THE INVENTION

1. Field of the Invention

The present invention relates to an absorption type refrigeration system which makes use of heat derived from an internal combustion engine and, more particularly, to a combination of the absorption type refrigeration system and the internal combustion engine for making simultaneous use of both of engine exhaust gas and heated engine cooling water as the heat sources of the refrigeration system.

2. Description of the Prior Art

Absorption type refrigeration systems making use of heat energy derived from internal combustion engines have been proposed in, for example, specifications of U.S. Pat. Nos. 2,667,040; 2,783,622 and 2,953,907. These known systems, however, are each designed merely to introduce the engine exhaust gas from the engine into a generator to heat and evaporate a solution in the generator, and are not arranged to make use of the heat possessed by the heated cooling water circulated through the engine. On the other hand Japanese Patent Laid-Open No. 158047/1975 suggests a simultaneous use of both of the engine exhaust gas and the heated cooling water as the heat sources of an absorption type refrigeration system. This literature, however, does not discloses at all any practical and specific arrangement for permitting the simultaneous use of the exhaust gas and cooling water as the heat sources of the absorption type refrigeration system.

Thus, none of the prior publications referred to above teaches any practical and effective combination of an absorption type refrigeration system with the engine exhaust system and cooling water system for permitting simultaneous use of the exhaust gas and cooling water as the heat sources for the refrigeration system.

SUMMARY OF THE INVENTION

Accordingly, an object of the invention is to provide a concrete and practical combination of an absorption type refrigeration system with an internal combustion engine for permitting simultaneous use of both of the exhaust gas and the cooling water as the heat sources for the absorption type refrigeration system.

Another object of the invention is to provide a combination of an absorption type refrigeration system with an internal combustion engine, which can make a simultaneous use of both of the exhaust gas and the cooling water to utilize most part of the heat discharged from the engine as the heat sources for absorption type refrigeration system.

Still another object of the invention is to provide a combination of an internal combustion engine and an absorption type refrigeration system which ensures a smooth and reliable refrigerating operation of an absorption type air cooling system.

To these ends, according to the invention, there is provided a combination of an absorption type refrigeration system and an internal combustion engine, the absorption type refrigeration system including an evaporator for generating chilled water, an absorber in which a gaseous refrigerant is absorbed by a solution to generate a thin solution of a comparatively low density, at least two generators adapted for heating a solution thereby to generate the gaseous refrigerant, a condenser adapted for condensing the gaseous refrigerant generated in the generators into a liquid refrigerant, a pump for delivering the thin solution generated in the absorber into the generators, and at least one heat exchanger for effecting a heat exchange between the solution flowing into the generators and the solution flowing out of the generators, while the internal combustion engine includes an exhaust gas passage and an engine cooling water passage, wherein the exhaust gas passage of the engine is connected to a first generator which operates at a temperature higher than any other generators in the absorption type refrigeration system, while the engine cooling water passage is connected to heating tubes of a second generator which operates at a temperature lower than the operating temperature of the first generator, whereby both of the exhaust gas emitted from the engine and heated engine cooling water circulated through the engine are simultaneously used as the heat sources of the absorption type refrigeration system.

Other objects, features and advantages of the invention will become apparent from the following description of a preferred embodiment of the invention in conjunction with the accompanying drawings.

BRIEF DESCRIPTION OF THE DRAWINGS

FIG. 1 is a system diagram of an embodiment of an absorption type refrigeration system in accordance with the invention;

FIG. 2 is a system diagram of a part of the absorption type refrigeration system shown in FIG. 1; and FIG. 3 is a schematic illustration of a practical form of a part of the absorption type refrigeration system of the invention.

DESCRIPTION OF THE PREFERRED EMBODIMENT

Referring to the drawings, an absorption type refrigeration system embodying the present invention includes an evaporator 1, an absorber 2, a first generator 3, a second generator 4, a third generator 5, a solution circulating pump 6, a condenser 7, a first heat exchanger 8, a second heat exchanger 9, a refrigerant spray header 10, a refrigerant pump 11 and so forth. The evaporator 1 has a tube nest 1A composed of a multiplicity of tubes through which water is circulated, while the space in the evaporator 1 forms an evaporation chamber in which a liquid refrigerant (water) is evaporated by latent heat derived from the water circulated through the tubes thereby to produce cooled water. The absorber 2 also has a tube nest 2A composed of a multiplicity of tubes through which cooling water is circulated to cool an evaporated gaseous refrigerant and a solution in the absorber 2 so that the gaseous refrigerant from the evaporator 1 is absorbed into the solution thereby to form a thin solution of a low concentration. In the illustrated embodiment of the invention, the solution is a water solution of lithium bromide. The first generator 3 has a heating gas passage 3A through which the exhaust gas from an internal combustion engine 12 flows to deliver the heat to a thin solution in the generator 3 thereby to generate a gaseous refrigerant. The second generator 4 has a tube nest 4A composed of a multiplicity of tubes through which heated engine cooling water from the engine 12 is circulated to heat a thin solution in the generator 4 thereby to generate a gaseous refrigerant. In the third generator 5, the gaseous refrigerant generated in the first generator 3 is caused to pass through tubes of a tube nest 5A to deliver heat to a thin solution in the generator 3 thereby to generate a gaseous refrigerant.

The supply of the thin solution generated in the absorber 2 to the first, second and third generators 3, 4 and 5 is effected by the solution circulating pump 6. The condenser 7 has a tube nest 7A composed of a multiplicity of tubes through which cooling water is circulated, while the space in the condenser 7 constitutes a condensation chamber into which are introduced the refrigerant which has been generated in gas phase by the first generator 3 and then liquefied as a result of heating of the thin solution in the second generator 4, and the gaseous refrigerant generated in the second and third generators 4 and 5. The liquefied refrigerant and the gaseous refrigerant into the condenser 7 are cooled and liquefied by the cooling water flowing through the tubes of the tube nest 7A. In the second heat exchanger 9, heat exchanged is conducted between the thin solution which is being supplied from the absorber 2 into the first generator 3 and a thick solution which is being returned from the first generator 3 to the absorber 2. In the first heat exchanger 8, heat exchanged is conducted between the solution which is being supplied from the absorber 2 to the second and third generators 4 and 5 and the solution which being returned from the second and third generators 4 and 5 to the absorber 2. In order to promote the evaporation of the refrigerant in the evaporator 1, the liquid refrigerant is pumped from the bottom of the evaporator 1 by the refrigerant pump 11 and is then sprayed to fail into the evaporator 1 through the refrigerant spray header 10.

The evaporator 1, absorber 2, third generator 5 and the condenser 7 are accomodated by a single container or housing in a manner shown in FIG. 3. As will be seen from this Figure, the third generator 5 and the condenser 7 are separated from each other preferably by means of an eliminator which permits only the evaporated part of the coolant to pass therethrough. A similar eliminator is preferably used to separate the evaporator 1 and the absorber 2 from each other.

The connection between the internal combustion engine 12 and the absorption type refrigeration system will be most clearly seen from FIG. 2. The engine 12 has an exhaust gas passage 13 and a heated cooling water passage 14. The exhaust gas passage 13 is connected to the heating gas passage 3A of the first generator 3, while the heated cooling water passage 14 is connected to the tubes of the tube nest 4A in the second generator 4 to form an engine cooling water circulation passage. An engine cooling water pump 15 is disposed in the engine cooling water circulation passage at the upstream point of the second generator 4 as viewed in the direction of flow of the heated engine cooling water.

In operation, an engine exhaust gas of a temperature of about 700° C. is introduced from the exhaust gas passage 13 into the exhaust gas passage 3A in the first generator 3. As exhaust gas flows through the exhaust gas passage 3A, heat is delivered from the exhaust gas to the solution in the first generator 3 thereby to generate the evaporated gaseous refrigerant. As a result, the exhaust gas is cooled down to about 150° to 200° C. before it is discharged to the atmosphere. On the other hand, the solution is condensed into a thick solution.

The gaseous refrigerant generated in the first generator 3 is introduced into the heating tube nest 5A of the third generator 5 through a passage 16. As the gaseous refrigerant flows through the heating tube nest 5A, it heats up the solution in the third generator 5 thereby to generate an evaporated gaseous refrigerant, while the heating gaseous refrigerant itself is cooled and condensed and this condensate, i.e., the liquid refrigerant flows into the condenser 7 through a passage 17.

On the other hand, the heated engine cooling water of a temperature generally ranging from 60° to 150° C. is circulated through the engine cooling water circulation passage 14. While flowing through the heating tube nest 4A of the second generator 4, the heated engine cooling water delivers the heat to the solution in the second generator 4 thereby to generate an evaporated gaseous refrigerant. The gaseous refrigerant generated in the second generator 4 and the gaseous refrigerant generated in the third generator 5 are introduced into the condenser 7 through passages 18 and 19, respectively. The gaseous refrigerant and the liquid refrigerant introduced into the condenser 7 are cooled by the cooling water flowing through the tube nest 7A so that the gaseous refrigerant is condensed into liquid refrigerant. The condensate, i.e., the liquid refrigerant, is then introduced from the condenser 7 into the evaporator 1 through a passage 20. The liquid refrigerant introduced into the evaporator 1 is then pumped from the bottom of the evaporator 1 and is pressurized by the refrigerant pump 11 and the pressurized liquid refrigerant is sprayed onto the tube nest 1A by means of the spray header 10. It will be seen that the evaporation of the liquid refrigerant is promoted as a result of the spraying. The evaporation of the refrigerant in the evaporator 1 is caused by the latent heat derived from the cooling water flowing through the tubes of the tube nest 1A. In consequence, the cooling water is cooled to a low temperature to become cooled water. This cooled water is then circulated through a pipe (not shown) to a heat exchanger (not shown) such as a fan coil unit (not shown) which is installed in a room or rooms to be cooled and by which heat exchange is conducted between the cooled water and air flowing through the fan coil unit into the room or rooms.

The evaporated gaseous refrigerant generated in the evaporator 1 is introduced through a passage 29 into the absorber 2. The thick solutions produced by the first, second and third generators 3, 4 and 5 are also introduced into the absorber 2 through the passages 21, 22 and 23, respectively. As a result, the gaseous refrigerant coming from the evaporator 1 is absorbed into the thick solution to form a thin solution. In order to attain a high efficiency of the absorption of the gaseous refrigerant into the thick solution, the absorber 2 is provided with the tube nest 2A consisting of a multiplicity of tubes through which cooling water is circulated from a cooling tower (not shown) to cool the thick solution and the gaseous refrigerant, and with a spray header 24 from which the solution is sprayed.

A part of the thin solution which is being delivered by the solution circulating pump 6 to respective generators 3, 4 and 5 through the passage 26 shunts from a passage 26 and is introduced into the spray header 24 through a passage 25, so that the spray header 24 sprays a mixture of the thick solutions which are returned from the generators 3, 4 and 5 through the passages 21, 22 and 23 and the thin solution flowing from the passage 25.

The thin solution generated in the absorber 2 is introduced to respective generators 3, 4 and 5 through the passage 26 and two passages 27 and 28 branching from the passage 26.

From the foregoing description, it will be understood that the absorption type refrigeration system of the invention can effectively make a simultaneous use of both of the exhaust gas and the heated engine cooling water as the heat sources to produce cooled water usable as a liquid coolant for the cooling of air and other objects.

Although the invention has been described by specific terms, it is to be noted that the described embodiment is not exclusive. Namely, the arrangement of constituents of the absorption type refrigerating system can be changed within the scope of the invention in various ways, provided that the engine and the refrigerating system are combined with each other in such a manner that the exhaust gas from the engine is utilized as a heat source for a generator at the highest operating temperature while the heated engine cooling water is used as another heat source for another generator which operates at a temperature lower than the operating temperature of the first generator utilizing the exhaust gas as the heat source.

What is claimed is:

1. A combination of an absorption type refrigeration system and an internal combustion engine, said absorption type refrigeration system including an evaporator for generating cooled water, an absorber in which a gaseous refrigerant is absorbed into a solution to generate a thin solution of a low concentration, at least two generators adapted for heating a solution thereby to generate a gaseous refrigerant, a condenser for condensing the gaseous refrigerant generated in said generators into a liquid refrigerant, a pump for delivering said thin solution generated in said absorber into said generators, and at least one heat exchanger for effecting a heat exchange between the solution flowing into said generators and the solution flowing out of said generators, said internal combustion engine including an exhaust gas passage and an engine cooling water passage, wherein said exhaust gas passage of said engine is connected to a first generator which operates at the highest temperature in said absorption type refrigeration system, while said engine cooling water passage is connected to a heating tube of a second generator which operates at a temperature lower than the operating temperature of said first generator, whereby both of the exhaust gas discharged from said engine and the heated engine cooling water circulated through said engine are simultaneously used as the heat sources of said absorption type refrigeration system.

2. A combination as claimed in claim 1, wherein said engine cooling water passage and said heating tubes of said second generator in combination constitute an engine cooling water circulating passage in which the heated engine cooling water coming from said internal combustion engine is introduced into said heating tube of said second generator from one end of said heating tube and returned to said engine from the other end of said heating tubes.

3. A combination as claimed in claim 2, wherein said engine cooling water circulating passage includes an engine cooling water circulating pump disposed therein at an upstream point of said second generator as viewed in the direction of the flow of said heated engine cooling water.

4. An absorption type refrigeration system including:

an internal combustion engine provided with an engine cooling water passage and an exhaust gas passage;

a first generator having a heating gas passage in fluid flow communication with said exhaust gas passage and adapted to heat a solution by the heat derived from the engine exhaust gas flowing through said heating gas passage thereby to generate an evaporated gaseous refrigerant;

a second generator having a first heating tube in fluid flow communication with said engine cooling water passage and adapted to heat a liquid refrigerant by the heat derived from heated engine cooling water flowing through said heating tube thereby to generate an evaporated gaseous refrigerant;

a third generator having a second heating tube in fluid flow communication with said first generator and adapted to heat a solution by the heat derived from the gaseous refrigerant coming from said first generator thereby to generate an evaporated gaseous refrigerant;

a condenser in fluid flow communication with said first, second and third generators and adapted to cool the gaseous refrigerant coming from said generators to condense said gaseous refrigerant into liquid refrigerant;

an evaporator having a heat transfer tube and adapted to cool a heat medium circulated through said heat transfer tube by evaporating the liquid refrigerant coming from said condenser;

an absorber in which the gaseous refrigerant generated in said condenser is absorbed in the solution returned from said generators thereby to form a thin solution of a concentration which is lowest in the refrigeration system.

a solution circulating pump adapted to deliver said thin solution generated in said absorber to said generators;

a refrigerant pump adapted to pump the liquid refrigerant from said evaporator and deliver the liquid refrigerant to a refrigerant spraying header disposed above said heat transfer tube in said evaporator; and at least one heat exchanger for conducting heat exchange between the thin solution flowing into said generators and the solution flowing from said generators.

5. An absorption type refrigeration system as claimed in claim 4, further including a discharge passage connected to said solution circulating pump and branched into a first passage leading to said first generator, a second passage leading to said second generator and a third passage leading to said third generator, whereby supplies of said thin solution generated in said absorber to said first, second and third generators are parallel to each other.

6. An absorption type refrigeration system as claimed in claim 4, wherein said absorber includes a cooling water tube and a spray header disposed above said cooling water tube, said spray header being communicated with a passage which is connected to passages through which thick solution is returned from said generators and also to a passage which shunts from the discharge passage of said solution circulating pump.

* * * * *